(12) United States Patent
Hartz

(10) Patent No.: US 6,515,389 B1
(45) Date of Patent: Feb. 4, 2003

(54) PERMANENT FIELD SMALL-SIZE MOTOR

(75) Inventor: Guenter Hartz, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,407

(22) PCT Filed: Jul. 3, 1999

(86) PCT No.: PCT/DE99/02053

§ 371 (c)(1),
(2), (4) Date: Jun. 27, 2000

(87) PCT Pub. No.: WO00/21181

PCT Pub. Date: Apr. 13, 2000

(30) Foreign Application Priority Data

Oct. 2, 1998 (DE) .......................... 198 45 370

(51) Int. Cl.⁷ .............................. H02K 21/26
(52) U.S. Cl. ..................... 310/154.08; 310/40 MM
(58) Field of Search ............... 310/154.01, 154.08, 310/40 MM, 89

(56) References Cited

U.S. PATENT DOCUMENTS

| | | | | |
|---|---|---|---|---|
| 4,151,435 A | * | 4/1979 | Jandeska et al. | 310/154.01 |
| 4,296,343 A | * | 10/1981 | McMillen | 310/154.01 |
| 4,409,505 A | * | 10/1983 | Petersen | 310/90 |
| 4,453,097 A | * | 6/1984 | Lordo | 310/154.01 |
| 4,508,988 A | * | 4/1985 | Reiss et al. | 310/154.01 |
| 5,412,267 A | * | 5/1995 | Okada et al. | 310/42 |

FOREIGN PATENT DOCUMENTS

| | | | |
|---|---|---|---|
| DE | 23 47 856 | * | 4/1975 |
| JP | 09-070161 | * | 3/1997 |

* cited by examiner

Primary Examiner—Joseph Waks
(74) Attorney, Agent, or Firm—Ronald E. Greigg

(57) ABSTRACT

A permanent magnet-excited small motor having an armature supported rotatably about a pivot axis, at least two permanent magnet poles surrounding the armature on opposed portions, and a pole housing, connecting the permanent magnet poles. In the region between the permanent magnet poles, the pole housing has flat faces, which are curved convexly outward.

19 Claims, 3 Drawing Sheets

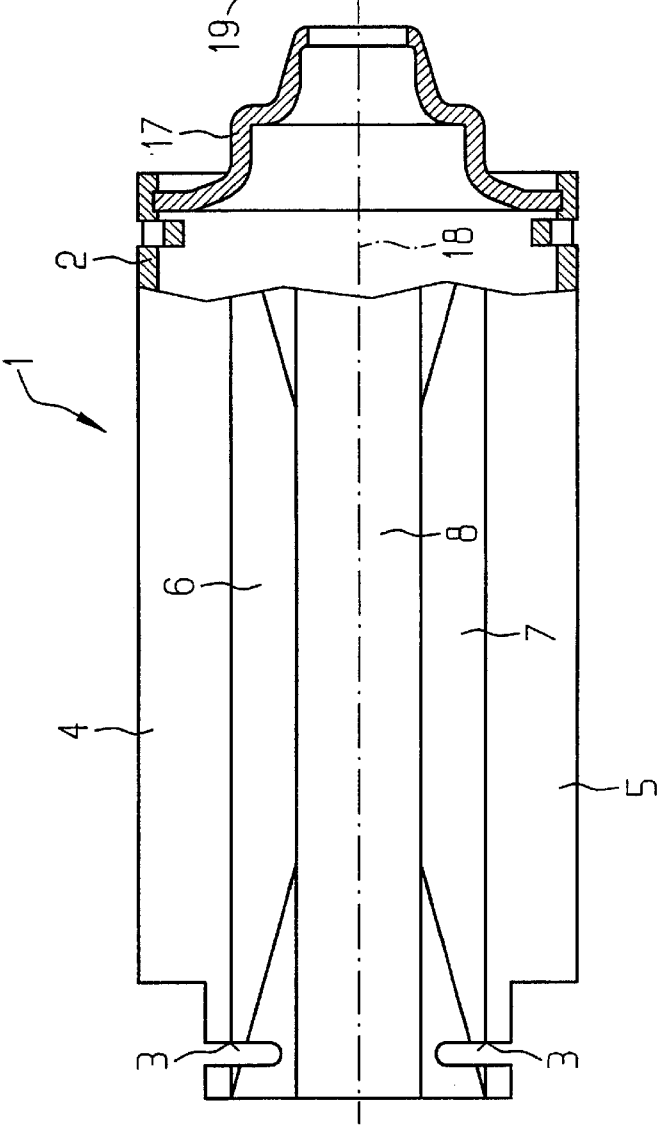
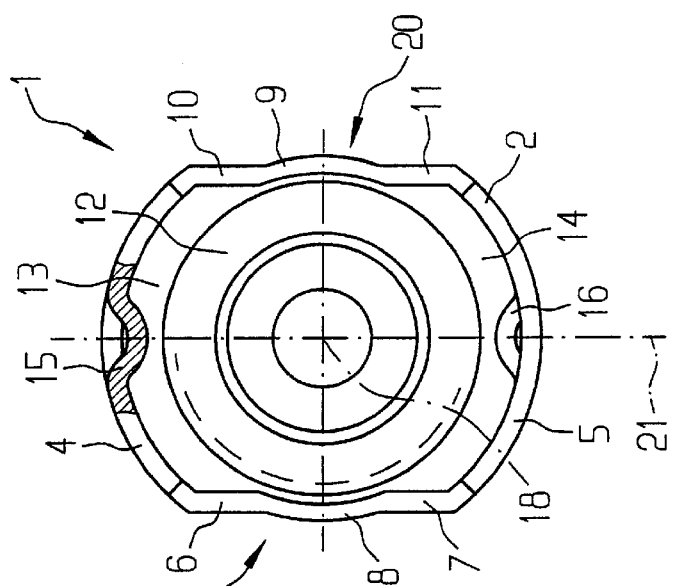

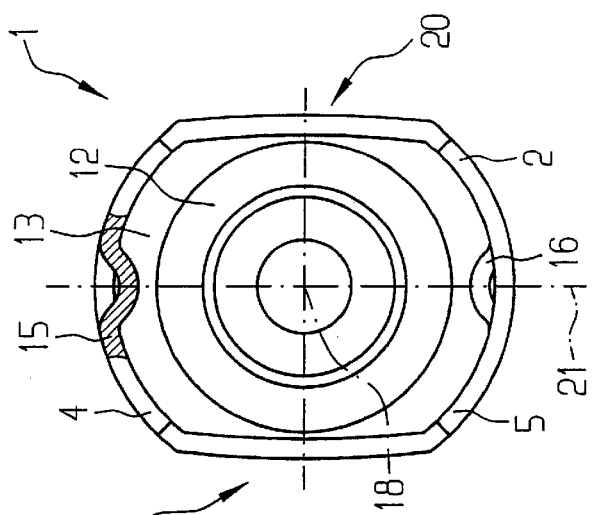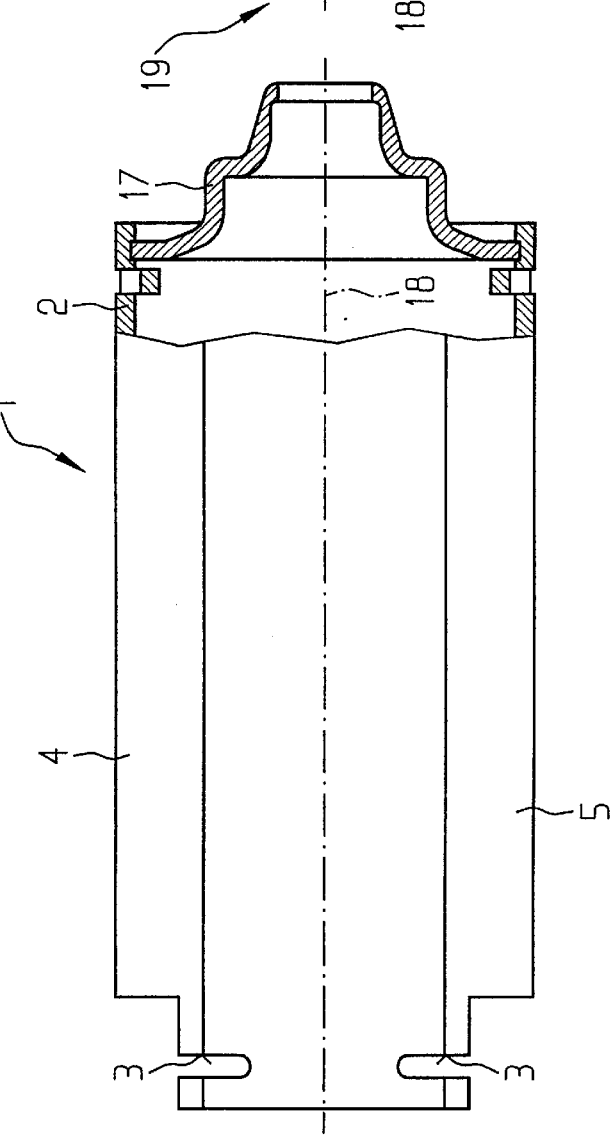

PERMANENT FIELD SMALL-SIZE MOTOR

BACKGROUND OF THE INVENTION

1. Field of the Invention

The invention relates to electric motors and more particularly to a permanent magnet-excited small motor.

2. Description of the Prior Art

A permanent magnet-excited small motor of the type with which this invention is concerned is known from German Utility Model DE 84 28 487. The permanent magnet-excited small motor described in this reference is used for instance as a drive mechanism for a motor vehicle window control. It has a rotor, rotatably supported about a pivot axis, that includes a commutator and an armature put together from a lamination package. Two permanent magnet poles surrounding the armature at opposed portions are also provided, which communicate with one another via a pole housing that encloses the armature and the permanent magnet poles annularly, so that the magnetic short circuit is carried via the pole housing. The pole housing is injection-molded into a plastic motor housing. In the regions between the permanent magnet poles, both the pole housing and the plastic motor housing surrounding the pole housing each have flat faces, so that the pole housing and the motor housing are embodied in a space-saving way and require only a small installation space, for instance in a door of the vehicle.

A disadvantage of the known permanent magnet-excited small motor, however, is that noise emissions in the flattened pole housing are increased, compared to a completely round structural design. Moreover, the motor performance and the torque generated by the small motor are reduced because of the transverse armature field between the flattened side regions.

SUMMARY OF THE INVENTION

The permanent magnet-excited small motor of the present has the advantage over the prior art that noise emissions are reduced markedly, compared with the permanent magnet-excited small motor with completely plane flat faces of the pole housing as known from the prior art. Since according to the invention the flat faces of the pole housing are curved convexly outward in at least some portions, a certain rounding of the pole housing is attained despite the flat faces provided. On the one hand, this reduces the impetus to vibration in the region of the flat faces of the pole housing, since a greater spacing is established between the pole housing and the armature, and the vibration-inducing forces are thus reduced. On the other, a reduced propagation of structure-borne sound of the pole housing is also obtained, because of a diffusor effect engendered by the rounding.

At the same time, because of the increased spacing between the armature and the flat faces of the pole housing, the cross induction, which extends perpendicular to the axis connected the two permanent magnet poles and connects the two flat faces to one another via the armature, is reduced. The reduction in the cross induction leads to an increased torque of the permanent magnet-excited small motor and thus to a higher motor performance.

Despite the convexly outward-oriented curvature of the flat face of the pole housing as provided by the invention, the pole housing requires only relatively little installation space, which compared with a plane embodiment of the flat faces is at most only slightly increased and compared with a completely round design of the pole housing is reduced still more markedly. The small motor of the invention can therefore be installed in a space-saving way, for instance in motor vehicles.

The flat faces can be convexly curved outward either entirely or only in some portions. In the latter case, plane regions can be provided adjacent the permanent magnet poles, and convexly outward-curved regions can be provided between the plane regions; the curved regions then advantageously have a center point of curvature that coincides with the pivot axis of the armature, so that the curved regions surround the armature at a uniform spacing.

If the convex curvature is shaped such that the radial spacing between the flat faces and the armature is markedly greater than the radial spacing between the permanent magnet poles and the armature, the cross induction is reduced markedly compared to the primary armature field.

BRIEF DESCRIPTION OF THE DRAWINGS

The foregoing features and advantages will be apparent from the detailed description contained hereinbelow, taken in conjunction with the drawings, in which:

FIG. 1A, is longitudinal view, partly in section of one embodiment of a permanent magnet-excited small motor according to the invention; of one embodiment of a permanent magnet-excited small motor according to the invention;

FIG. 1B, is an end view, partially in section, of the permanent magnet-excited small motor shown in FIG. 1A;

FIG. 2A, is a view similar to FIG. 1A showing a second embodiment of the of a permanent magnet-excited small motor of the invention;

FIG. 2B, is an end view, partly in section, of the permanent magnet-excited small motor shown in FIG. 2A.

DESCRIPTION OF THE PREFERRED EMBODIMENTS

Figure 3:
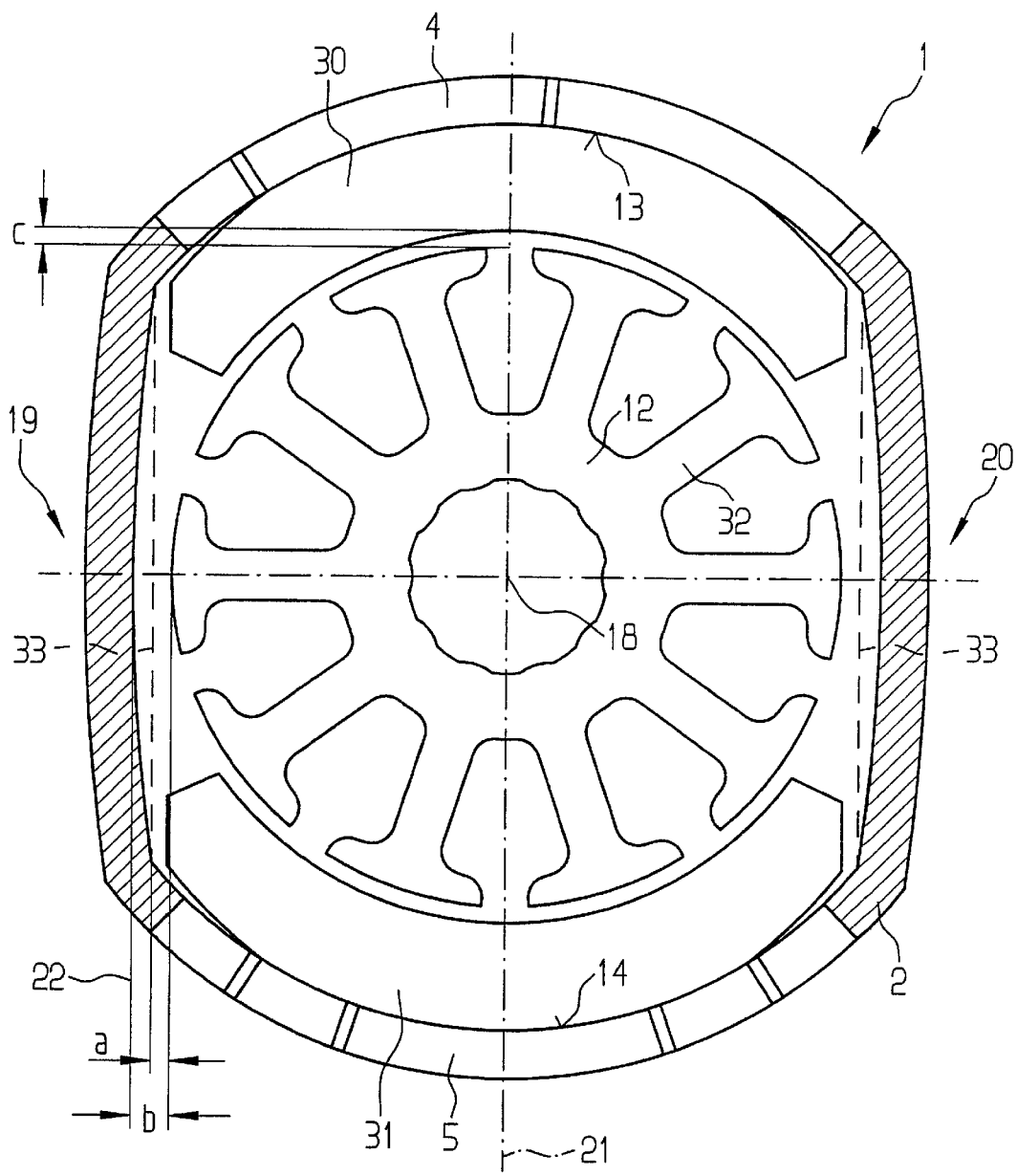
FIG. 3, an enlarged and more-detailed view of the small motor shown in FIGS. 2A and 2B, in a transverse view partly in section.

In FIG. 1A, a first exemplary embodiment of a permanent magnet-excited small motor of the invention, is shown in a longitudinal view, partly in section. The permanent magnet-excited small motor, identified by reference numeral 1, can be used as a drive motor in manifold ways, particularly in the automotive field, for instance as a drive mechanism for a motor vehicle window controller. The pole housing 2, simultaneously acting as a motor housing in the this exemplary embodiment, can be seen, partly in section, in FIG. 1A. By means of oblong mounting slots 3, the pole housing 2 can be installed, for instance in a motor vehicle.

The pole housing 2 has a first curved region 4, enclosing a first magnet pole not visible in FIG. 1A, a second curved region 5, enclosing a second permanent magnet pole, also not visible in FIG. 1A, a first plane region 6 adjoining the first curved region 4, a second plane region 7 adjoining the second curved region 5, and a convexly outward-curved region 8 disposed between the plane regions 6 and 7. As seen in FIG. 1B, which shows a transverse view, partly in section, of the exemplary embodiment shown in FIG. 1A, a fourth convexly outward-curved region 9 is located opposite the third convexly outward-curved region 8 and is disposed between a third plane region 10 and a fourth plane region 11. The third plane region 10 adjoins the first curved region 4, opposite the first plane region 6, while the fourth plane region adjoins the second curved region 5, opposite the second plane region 7. In the exemplary embodiment, the described regions 4–11 of the pole housing 2 are regions of an overall integrally embodied pole housing 2, which annularly encloses an armature 12 and permanent magnet poles, not shown in FIGS. 1A and 1B. The permanent magnet poles can be installed in installation chambers designated by reference numerals 13 and 14. Inward-protruding mortises 15 and 16 serve to lock the permanent magnet poles axially.

The armature 12 is rotatably supported on the pole housing 2 about a pivot axis 18 via a bearing plate 17 that at the same time forms a caplike closure of the pole housing 2. On the end of the pole housing opposite the bearing plate 17, a further bearing for the armature 12 is provided. The armature 12 is typically assembled from a lamination package and has a plurality of armature windings, which are connected to electrical power lines via a commutator, not shown.

According to the invention, the pole housing 4 has two flat faces 19 and 20 in the region between the permanent magnet poles installed in the installation chambers 13 and 14; these flat faces are curved convexly outward. In the exemplary embodiment shown in FIGS. 1A and 1B, the flat faces 19 and 20 are curved convexly outward only in some portions, in the region of the third and fourth curved region 8 and 9, while the other regions 6, 7, 10 and 11 of the flat faces 19 and 20 are plane and extend parallel to the axis 21 connecting the permanent magnet poles.

The flat faces 19 and 20 reduce the required installation space compared to a completely round embodiment of the pole housing 2 and thus contribute to a space-saving design of the permanent magnet-excited small motor 1. Compared to the design known from the prior art, in which the flat faces 19 and 20 are embodied as plane throughout, the installation space is even reduced still further, since the plane regions 6, 7, 10 and 11 can be disposed farther toward the inside. What is even more essential, however, is the reduced noise emissions, since the propagated structure-borne sound of the pole housing 2 is markedly reduced because of the rounding created by the curved regions 8 and 9 and the attendant diffusor effect. Furthermore, the increased spacing between the pole housing 2 and the armature 12 in the region of the flat faces 19 and 20 leads to an increased torque and thus to an increased motor performance of the permanent magnet-excited small motor 1 of the invention, which will be addressed in further detail hereinafter.

In the exemplary embodiment shown in FIGS. 1A and 1B, the center point of curvature of both the first and second curved regions 4 and 5 and of the third and fourth curved regions 8 and 9 according to the invention coincides with the pivot axis 18 of the armature 12. The curved regions 8 and 9 are therefore adapted to the radius of the armature 12.

FIG. 2A shows a second exemplary embodiment of the permanent magnet-excited small motor 1 of the invention in a longitudinal, partly sectional view, while FIG. 2B shows the second exemplary embodiment of FIG. 2A in a transverse view, partly in section. Elements already described are provided with the same reference numerals and need not be described again here.

The difference in the second exemplary embodiment of FIGS. 2A and 2B from the first exemplary embodiment shown in FIGS. 1A and 1B is that the flat faces 19 and 20 are convexly curved outward not only in some portions at the curved regions 8 and 9, but that instead the flat faces 19 and 20 are curved convexly outward throughout. The radius of curvature with which the flat faces 19 and 20 are curved convexly outward in the second exemplary embodiment is markedly greater in comparison to the radius of curvature of the curved regions 8 and 9 of the first exemplary embodiment.

For the sake of better understand of the invention, in FIG. 3 the permanent magnet-excited small motor 1 corresponding to the exemplary embodiment of FIGS. 2A and 2B is shown again on a larger scale, in more detail, in a transverse view partly in section. Once again, elements already described are provided with the same reference numerals and will therefore not be described again here.

In FIG. 3, the permanent magnet poles 30 and 31 are shown, installed in the installation chambers 13 and 14. The armature 12 is also shown in more detail, and it can be seen that the armature 12 has a plurality of substantially radially extending ribs 32, each of which is wound with an armature winding, not shown in FIG. 3.

For comparison, a dashed line 33 in FIG. 3 indicates the course of the inner edge of the flat faces 19 and 20 embodied in plane form as in the prior art. If the flat faces 19 and 20 are embodied in plane form as in the prior art, the result is a spacing a between the inner edge of the flat faces 19 and 20 and the armature 12. If conversely, as provided according to the invention, the flat faces 19 and 20 are not plane but rather are embodied curving convexly outward, the result is a markedly increased spacing b between the inner edge of the flat faces 19 and 20 and the armature 12.

The magnetic cross induction extending perpendicular to the connecting axis 21, or in other words perpendicular to the length of the magnetic primary armature field, depends substantially on the spacing between the flat faces 19 and 20 of the pole housing 2 and the armature 12. By increasing the spacing, the cross induction can therefore be reduced, thus increasing the torque of the permanent magnet-excited small motor 1 of the invention and hence increasing the motor performance. Along with the already-described markedly reduced noise propagation, a further advantage of the design of the invention is therefore obtained in an increase in torque and motor performance.

The noise reduction is due on the one hand to the fact that the impetus to vibration of the flat faces 19 and 20 of the motor housing 2 is reduced because of the increased spacing b from the armature 12. The propagation of structure-borne sound from the pole housing 2 is also reduced because the curvature of the flat faces 19 and 20 and thus the rounding of the pole housing 2 creates a diffusor effect that reduces noise propagation.

The foregoing relates to preferred exemplary embodiments of the invention, it being understood that other variants and embodiments are thereof possible within the spirit and scope of the invention, the latter being defined by the appended claims.

I claim:

1. In a permanent magnet-excited small motor (1) having an armature (12) supported rotatably about a pivot axis (18), at least two permanent magnet poles (30, 31) surrounding the armature (12) on opposed portions, and a pole housing (2), connecting the permanent magnet poles (30, 31), each of said permanent magent poles (30, 31) is enclosed by a curved region (4, 5) of said pole housing (2) and in regions between two adjacent curved regions (4, 5) said pole housing (2) has faces (19, 20) which are curved convexly outward with less curvature than said curved regions (4, 5), and wherein the faces (19, 20) are closer to the pivot axis (18) of the armature than the curved regions (4, 5).

2. The permanent magnet-excited small motor according to claim 1, wherein the faces (19, 20) of the pole housing (2) are curved convexly outward throughout their extent.

3. The permanent magnet-excited small motor according to claim 2, wherein a radial spacing (b) between the curved regions of the faces (19, 20) and the armature (12) is greater than a radial spacing (c) between the permanent magnet poles (20, 31) and the armature (12).

4. The permanent magnet-excited small motor according to claim 2, wherein
the pole housing (2) annularly and in one piece surrounds the armature (12) and the permanent magnet poles (30, 31).

5. The permanent magnet-excited small motor according to claim 2,
a radial spacing (b) between a tangential plane (22) at the curved regions of the faces (19, 20) and the armature (12) is greater than a radial spacing (a) of a plane (33) through the ends of the faces (19, 20) and the armature (12).

6. The permanent magnet-excited small motor according to claim 1, wherein
a radial spacing (b) between the curved regions of the faces (19, 20) and the armature (12) is greater than a radial spacing (c) between the permanent magnet poles (20, 31) and the armature (12).

7. The permanent magnet-excited small motor according to claim 6, wherein the pole housing (2) annularly and in one piece surrounds the armature (12) and the permanent magnet poles (30, 31).

8. The permanent magnet-excited small motor according to claim 6,
a radial spacing (b) between a tangential plane (22) at the curved regions of the faces (19, 20) and the armature (12) is greater than a radial spacing (a) of a plane (33) through the ends of the faces (19, 20) and the armature (12).

9. The permanent magnet-excited small motor according to claim 1, wherein
the pole housing (2) annularly and in one piece surrounds the armature (12) and the permanent magnet poles (30, 31).

10. The permanent magnet-excited small motor according to claim 9,
a radial spacing (b) between a tangential plane (22) at the curved regions of the faces (19, 20) and the armature (12) is greater than a radial spacing (a) of a plane (33) through the ends of the faces (19, 20) and the armature (12).

11. The permanent magnet-excited small motor according to claim 1, wherein
a radial spacing (b) between a tangential plane (22) at the curved regions of the faces (19, 20) and the armature (12) is greater than a radial spacing (a) of a plane (33) through the ends of the faces(19, 20) and the armature (12).

12. In a permanent magnet-excited small motor (1) having an armature (12) supported rotatably about a pivot axis (18), at least two permanent magnet poles (30, 31) surrounding the armature (12) on opposed portions, and a pole housing (2) having a constant thickness throughout its entire extent connecting the permanent magnet poles (30, 31), each of said permanent magnet poles (30, 31) is enclosed by a curved region (4, 5) of said pole housing (2) and in regions of said pole housing between two adjacent curved regions (4, 5) said pole housing (2) has faces (19, 20) which have planar regions (6, 7, 10, 11) adjacent to said curved regions (4, 5) and a region (8, 9) curved convexly outward beyond said planar regions (6, 7, 10, 11) and disposed between two of the planar regions (6, 7, 10, 11).

13. The permanent magnet-excited small motor according to claim 12, the outward-curved regions (8, 9) each have a center point of curvature that substantially coincides with the pivot axis (18) of the armature (12).

14. The permanent magnet-excited small motor according to claim 13, wherein
a radial spacing (b) between the curved regions of the faces (19, 20) and the armature (12) is greater than a radial spacing (c) between the permanent magnet poles (20, 31) and the armature (12).

15. The permanent magnet-excited small motor according to claim 13, wherein the pole housing (2) annularly and in one piece surrounds the armature (12) and the permanent magnet poles (30, 31).

16. The permanent magnet-excited small motor according to claim 13,
a radial spacing (b) between a tangential plane (22) at the curved regions of the faces (19, 20) and the armature (12) is greater than a radial spacing (a) of a plane (33) through the ends of the faces (19, 20) and the armature (12).

17. The permanent magnet-excited small motor according to claim 12, wherein
a radial spacing (b) between the curved regions of the faces (19, 20) and the armature (12) is greater than a radial spacing (c) between the permanent magnet poles (20, 31) and the armature (12).

18. The permanent magnet-excited small motor according to claim 12, wherein
the pole housing (2) annularly and in one piece surrounds the armature (12) and the permanent magnet poles (30, 31).

19. The permanent magnet-excited small motor according to claim 12,
a radial spacing (b) between a tangential plane (22) at the curved regions of the faces (19, 20) and the armature (12) is greater than a radial spacing (a) of a plane (33) through the ends of the faces (19, 20) and the armature (12).

* * * * *